US006388742B1

(12) United States Patent
Duckett

(10) Patent No.: US 6,388,742 B1
(45) Date of Patent: May 14, 2002

(54) METHOD AND APPARATUS FOR EVALUATING THE PERFORMANCE CHARACTERISTICS OF ENDOSCOPES

(75) Inventor: George E. Duckett, Charlton, MA (US)

(73) Assignee: Karl Storz Endovision, Charlton, MA (US)

( * ) Notice: Subject to any disclaimer, the term of this patent is extended or adjusted under 35 U.S.C. 154(b) by 0 days.

(21) Appl. No.: 09/563,867

(22) Filed: May 3, 2000

(51) Int. Cl.⁷ .......................... G01N 21/00; A61B 1/00
(52) U.S. Cl. ...................... 356/73.1; 600/103
(58) Field of Search ................ 356/73.1, 124, 356/125, 127, 243.8; 250/201.1, 237 R, 227.11; 348/65, 61, 68; 600/101, 103, 160, 181; 359/362, 110

(56) References Cited

U.S. PATENT DOCUMENTS 4,737,622 A * 4/1988 Shishido et al. ............ 250/204
5,820,547 A * 10/1998 Strobl et al. ................ 600/127

* cited by examiner

Primary Examiner—Frank G. Font
Assistant Examiner—Michael P. Stefira
(74) Attorney, Agent, or Firm—St. Onge Steward Johnston & Reens LLC

(57) ABSTRACT

An apparatus for evaluating performance of a test endoscope includes a plurality of light sources, each generating a respective beam of light which is transmitted through the test endoscope. The apparatus further has a grid formed with a plurality of evenly spaced and uniformly sized pinholes intercepting a beam of light. The grid is utilized to perform a field of view, image quality, distortion, depth of field and an angle of view tests of the test endoscope. The apparatus further has a fiber optic light guide having one of its ends bifurcated and designed so that the bifurcated ends have the same output for evaluating light transmission through the test endoscope.

26 Claims, 7 Drawing Sheets

FIG. 13

KARL STORZ RIGID ENDOSCOPE INSPECTION SYSTEM VERSION 1.0  12/20/99 : 10 : 59 AM

COMMENTS

TEST SCOPE

SIM. STD. SCOPE

DEPTH OF FIELD: 6.4 mm TO > 55.0 mm

OBJECT DISTANCE (MM): 5  8  10  15  25  35  55

| | MEAS. | NOM. | CHANGE | P/F |
|---|---|---|---|---|
| ANGLE OF VIEW | 56.2° | 60.00° | 3.80° | PASS |
| FIELD OF VIEW | 95.2° | 80.71° | 14.49° | FAIL |
| DISTORTION 1.0 FIELD | -34.3% | -23.74% | -10.56% | |
| DISTORTION 0.7 FIELD | -22.9% | -13.93% | -8.97% | |
| ILLUMINATION SYSTEM EFFICIENCY | 0.11 | 0.21 | -0.10 | |
| RELATIVE BRIGHTNESS- IMAGING SYSTEM | 0.51 | 1.00 | -0.49 | |
| EDGE/PEAK ILLUMINATION AVERAGE | 0.31 | 0.49 | -0.18 | |
| CENTERING ARROR | 4.60% | 0.00% | 4.60% | |

IMAGE ANALYSIS STD SCOPE IMAGE

IMAGE ANALYSIS (CAMERA FOCUS INF) STD SCOPE INF IQ

ILLUM. ANALYSIS STD SCOPE ILLUM.

METHOD AND APPARATUS FOR EVALUATING THE PERFORMANCE CHARACTERISTICS OF ENDOSCOPES

PRIOR APPLICATION

This application is a co-pending application of U.S. application Ser. No. 09/563,866 entitled "Rigid Telescopic Inspection System" which is filed concurrently therewith, and is hereby expressly incorporated by reference as part of the present application.

FIELD OF THE INVENTION

The present invention relates to the testing, appraisal, and comparison of endoscopes by using an array of targets including a grid of evenly spaced pinholes to measure at least the image quality, field of view, distortion, and depth of field of an endoscope, a diffuse but translucent white target, a single pinhole target and a detector for measuring luminous flux.

BACKGROUND OF THE INVENTION

The heart of an endoscopic system is in its endoscope. There are two optical types—those which utilize lenses for image forwarding and formation, and those which utilize fiber optic bundles for forwarding the image. The former is usually referred to as a "rigid" endoscope, and the latter as a "flexible" endoscope. In all cases, the elements of the endoscope are carefully installed and aligned by the manufacturer so as to present the best image to the ocular piece, or to the camera, as possible.

The performance characteristics of the individual endoscope are of immediate and very intimate importance to the surgeon. Thus, the surgeon is to be aware, before the procedure, that the endoscope can inherently deliver the quality of image he requires, and that if it inherently has such quality, the instrument is in good enough condition that it can deliver that quality.

Depending on the inherent design of the endoscope, the specific instrument might not provide the magnification, clarity, depth of field and resolution which would be required, even if it appears undamaged from a cursory inspection.

Then it is an unfortunate fact that actions apart from its actual use in the patient such as handling, transporting and cleaning, the endoscope may have become misaligned or otherwise damaged. A resulting inability to resolve an area of the field should not first be discovered by the surgeon while the endoscope is inserted in the patient during an endoscopic procedure, as this may result in adverse consequences including additional surgery costs, surgery cancellations and increased risk to the patient.

What is desired, therefore, is an apparatus for evaluating the optical performance of an endoscope that utilizes a minimal number of measuring devices for performing a wide variety of optical tests. Also desirable is an apparatus for evaluating the optical performance of an endoscope that utilizes a grid of evenly spaced pinholes to measure the image quality, field of view, distortion, and depth of field of an endoscope. Providing an apparatus for automatically evaluating the optical performance utilizing a bifurcated fiber optic cable to precisely measure transmission of illumination fibers without manual intervention during a test is also desirable is also desirable. A method for automatically performing a series of tests on an endoscope and for comparing the results of these tests with a set of standardized parameters is also desirable, as is an apparatus for visually displaying the results of this comparison.

SUMMARY OF THE INVENTION

An apparatus and method according to the invention achieve it by generating beams of light which are transmitted through a distal end of an endoscope towards a proximal end of the endoscope. As a result, output signals indicative of one or more performance characteristics measured by a variety of tests are generated in response to signals corresponding to one or more of the conducted tests.

Particularly, a combination of a grid target, a diffuse but translucent white target, a single pinhole target and a detector for measuring luminous flux is capable of performing a variety of tests. This variety of tests includes measuring a field of view, geometrical distortion, angle of view, image quality at single and various object distances, percentage light transmission through illumination fibers, relative light transmission and illumination intensity across the field of view.

According to one aspect of the invention, a grid target has a plurality of pinholes and is utilized to measure the image quality, field of view, distortion, and depth of field of an endoscope to be tested. Thus, utilizing a single target which is provided with a plurality of evenly spaced pinholes, each having a uniform size, can make a variety of measurements.

In accordance with another aspect of the invention, a bifurcated fiber optic light guide attached to a light source is utilized to measure illumination transmission efficiency. The light guide is specifically designed so that it the output of one of the bifurcated ends end is known, then so it the output of the other. Thus, measuring the power out of the one unattached bifurcated end of this guide light and measuring the power out of the endoscope to which the other bifurcated end is attached one can calculate the transmission of the scope.

A number of tests can be automatically selected by utilizing a control system of the inventive device which allows a user to bypass any of the regular tests. The control system includes a central processing unit regulating the sequence of operations leading to performing any of or all of the regular optical tests. Images of the results can appear on a monitor and be compared to the standardized results stored in the system's database. Some of the images can be color-coded to assist a user in easy identification of the optical performance of the tested scope.

The apparatus in accordance with the invention allows a user to test an endoscope by comparing its optical performance with a standard endoscope whose parameters are stored in database. Alternatively, an endoscope can be tested without being compared with the standard one. Also, a set of new parameters of an endoscope to be tested can be added to database of the apparatus.

Accordingly, it is an object of the invention to provide a method and apparatus for evaluating the optical performance characteristics of a fiber optic endoscope.

Still another object of the invention is to provide an apparatus for measuring the mage quality, field of view, distortion, and depth of field of an endoscope by utilizing a single target having a plurality of pinholes.

Yet another object of the invention is to provide a method and apparatus for measuring illumination transmission of an endoscope by utilizing a bifurcated fiber optic light guide.

It is a further object of the invention to provide a method for operating an apparatus for evaluating the optical performance of an endoscope in a variety of automatic and manual modes.

It is still another object of the invention to provide a method for operating an apparatus for evaluating the optical performance of an endoscope to assist a user in conducting the evaluation.

BRIEF DESCRIPTION OF THE DRAWINGS

FIG. 13 is an exemplary display of a graphical user interface provided by a computer of FIG. 2 for evaluating results of a series of tests.

DETAILED DESCRIPTION OF THE DRAWINGS

Figure 1:
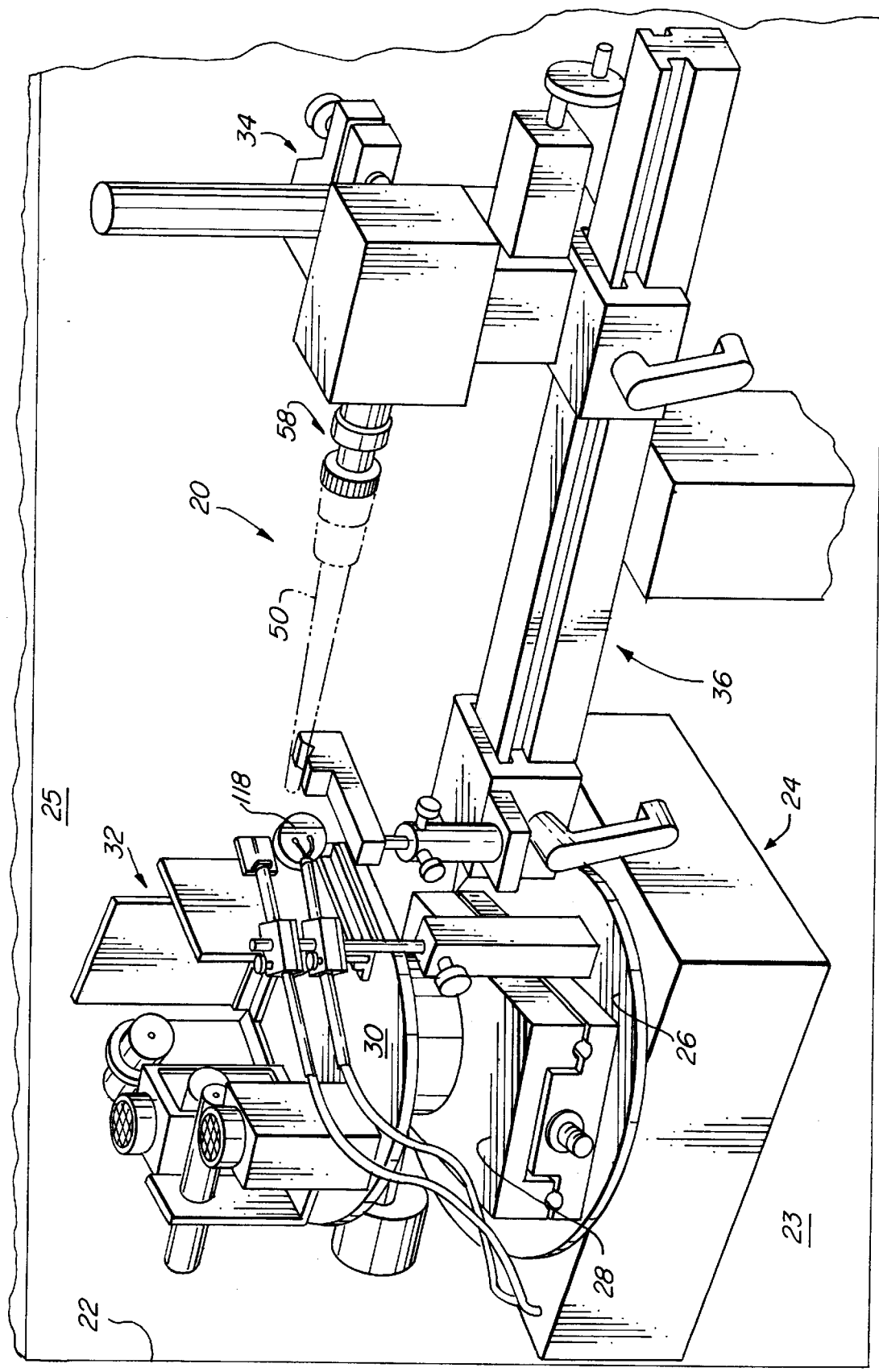
FIG. 1 is an isometric view of an apparatus in accordance with the invention.
Figure 2:
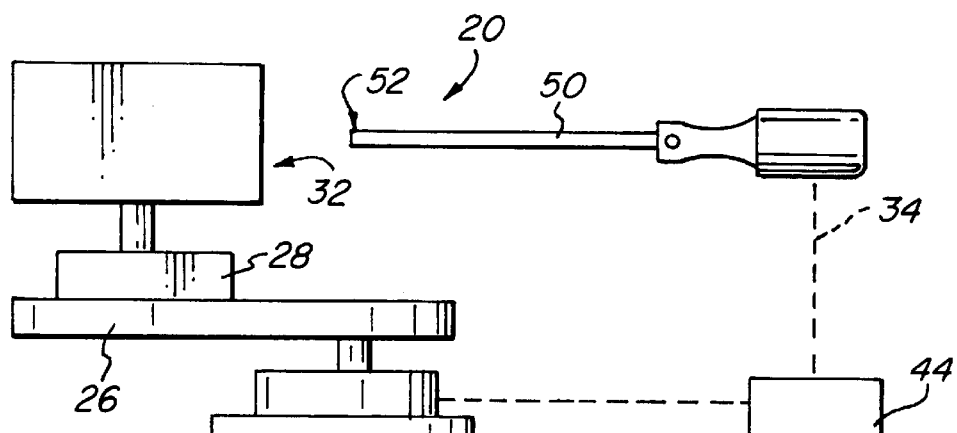
FIG. 2 is a diagrammatic view of an apparatus shown in FIG. 1.

As shown in FIGS. 1–2, a telescope inspection system 20 for evaluating the optical performance of an endoscope according to this invention includes a casing 22 having a bottom 23 and provided with a closure 25 which can close the casing during examination of an endoscope.

The casing 22 houses a testing station 24 which includes a turntable 26 rotatable to a known nominal angle of a standard endoscope, a linearly movable carousel support 28 and a carousel 30 carrying a plurality of targets 32 and capable of rotating independently from the turntable 26. The casing further encloses an endoscope support station 34 and an alignment station 36 extending between the endoscope support and testing stations.

As better illustrated in FIG. 2, the inspection system is constructed for testing any of a plurality of endoscopes 50 mounted on the endoscope support station 34 and having different physical and optical characteristics. The inspection system 20 is designed to perform a variety of tests on an endoscope by comparing it with a standard endoscope which has its reference parameters stored in memory of a central processing unit (CPU) 44. Preferably, a variety of standard endoscope types is manufactured by Karl Storz, and each of them has a respective set of reference parameters stored in the system. However, the inspection system 20 is also capable of evaluating the optical performance of new types of endoscopes in response to a set of parameters given by a user. Images and results of the tests are displayed on a monitor 46 and can be printed by a printer 48.

Examination of the endoscope 50 is performed by selectively displacing the carousel 30 in such a way that each of the targets is controllably positioned at a nominal object distance with respect to a distal end 52 of the endoscope to conduct a respective optical test. The term "target" broadly describes any of the various devices used for receiving and reflecting a transmitted beam to evaluate the physical and optical parameters of the endoscope 50. Cumulatively, the targets perform the following tests: a field of view, geometrical distortion, angle of view, image quality at single and various object distances, percentage light transmission through illumination fibers, relative light transmission of imaging system and illumination intensity across the field of view. The number of tests can be increased, but those listed above are the most critical tests that typically provide thorough examination of an endoscope.

The array of targets may have a various number of targets depending on a particular test to be conducted. As better shown in FIG. 3, the array 32 includes a diffuse but translucent white target 60, a grid with pinholes target 62, a detector 64 to measure optical power or luminous flux and a single pinhole target 66.

Figure 4:
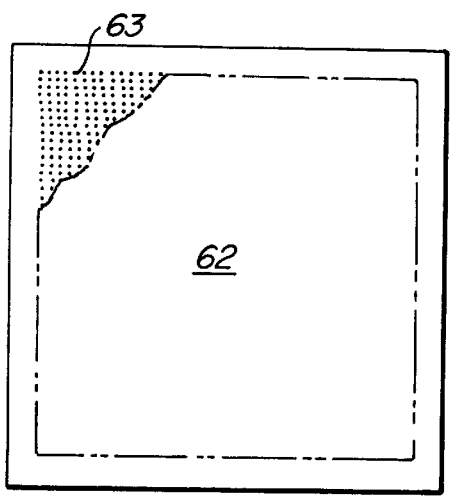
FIG. 4 is a schematic view of a grid target carried by an apparatus of FIGS. 1 and 2.

In accordance with one aspect of the invention shown in FIG. 4, the grid target 62 capable of performing at least the image quality test, field of view, distortion, and a depth of field of the endoscope 50 is formed with a plurality of evenly spaced pinholes 63. Given only as an example, the grid target 62 is a 6"×6" square plate made of glass. Particularly, the grid target has a dark chrome opaque metallic coating on a flashed, opal white translucent substrate. A uniform distance between holes may vary, however it is understood that pinholes have to be sufficiently spaced apart so they will not blur during examination of the scope. Preferably, this distance is 2.5 mm, whereas a diameter of each hole does not exceed 45 microns. Each of the holes is positioned in a center of a respective square. Based on this particular structure a variety of measurements can be easily made by the CPU that uses the algorithms as explained in greater detail herebelow.

Figure 3:
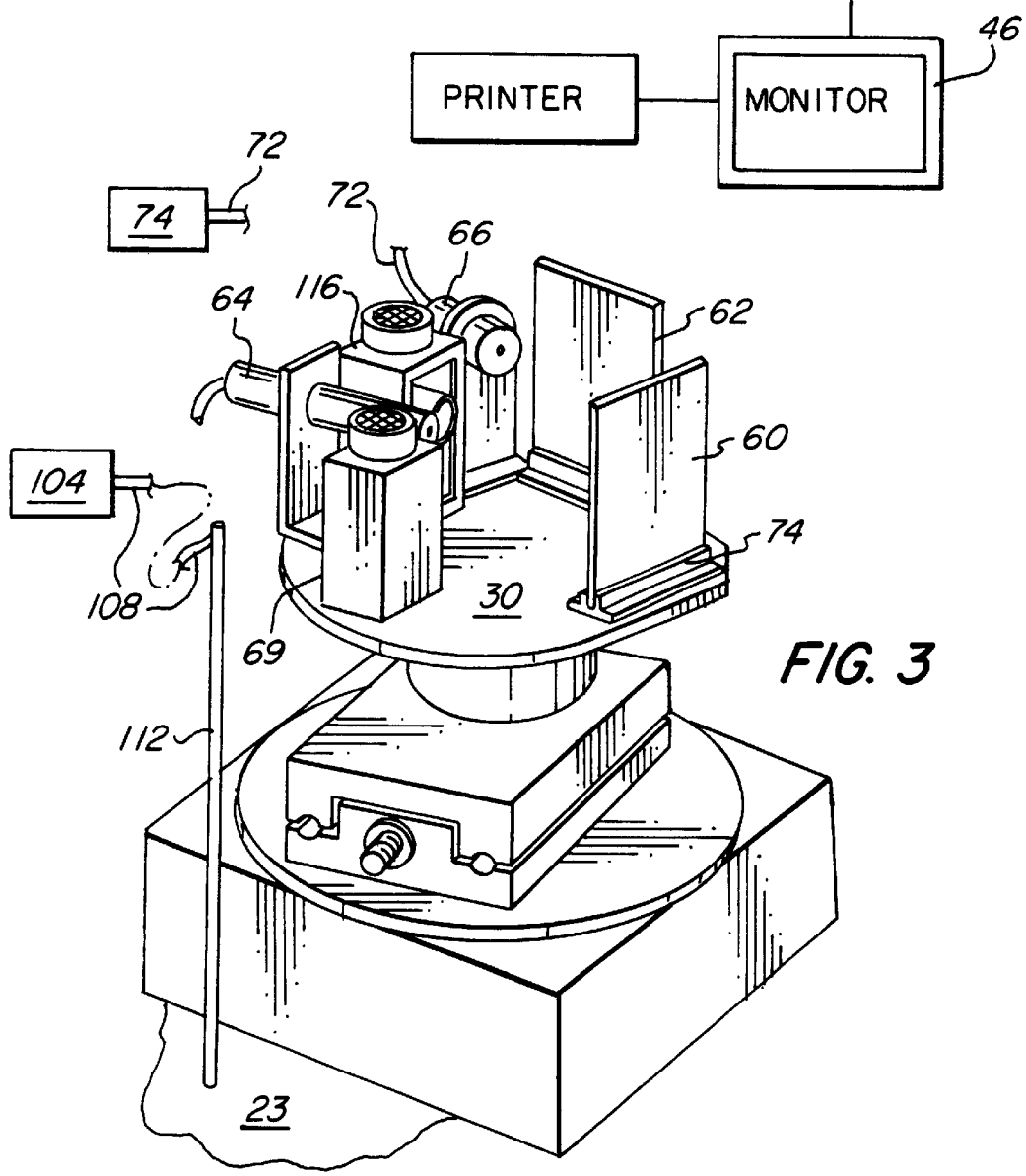
FIG. 3 is an isometric view of a carousel carrying a variety of targets of the apparatus of FIG. 1.

After the endoscope has been mounted to the support station 34 and placed in a testing position, as explained in U.S. application Ser. No. 09/563,866 filed concurrently with this Application, the distal end of the rigid endoscope 50 is positioned across the grid target 62 illuminated from behind by a first lamp 69, as seen in FIG. 3. The lamp is automatically turned on for a predetermined period of time, for example, 60 seconds during which the endoscope can be focused.

Perhaps, the very basic test without which many of the tests cannot be properly performed is the field of view test. The apparatus of the invention is designed to measure scopes having fields of view up to 120°. It is easy to calculate this angle by counting the number of pinholes displayed on the image which is grabbed by the CCD 58 and seen on the monitor and knowing the distance between the distal end of the endoscope and the grid.

Figure 5:
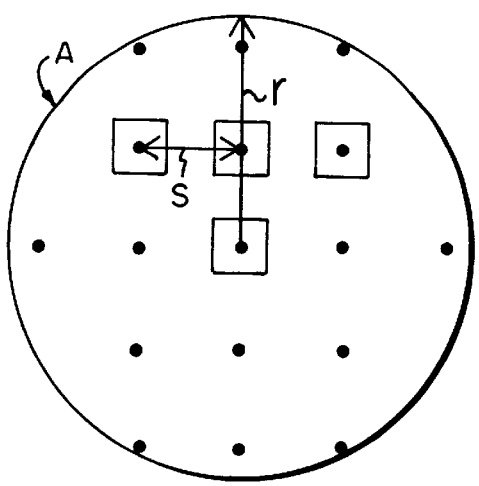
FIG. 5 is a graphical representation illustrating measurement of a field of view test.

Particularly, as shown in FIG. 5, an imaged area 70 can be determined according to the formula:

$$A=Ns^2$$

Where N is the number of pinholes and s is the spacing between pinholes. Since endoscopes have a circular field of view, the radius of the field being imaged can be determined:

$$r = \sqrt{A/n} = \sqrt{Ns^2/\pi}$$

where r is the radial height of the field being imaged. The field of view can then be determined:

$$\tan(fov/2) = r/d = s/d\sqrt{N/\pi}$$

$$fov = 2\tan^{-1}(s/d\sqrt{N/\pi})$$

where fov is the field of view and d is the grid or nominal object distance from the distal end 53 of the endoscope to the grid target 62.

The grid distance and the image quality of the scope to be tested can limit this test. If the grid distance is too short then too few pinholes will be imaged and the accuracy of the measurement will suffer. If the grid distance is too large the pinholes at the edge of the field of view will be visible, in which case there are no pinholes to image where there is still field of view. Based on experimental data, some generally good object distances are:

| approximate field of view | good object distances |
|---|---|
| less than 80° | 45 mm |
| 80–90° | 35 mm |
| 90–108° | 25 mm |
| 108° | 15 mm |

As will be explained below, the apparatus is capable to work in a comparative mode when nominal values of a standard endoscope, such as a nominal object distance, is stored in database. The apparatus can be used in a new endoscope mode and a non-comparative mode, wherein the above listed distances can be a reliable factor for proper measurements. The results of the test are illustrated in a test result table 150 of FIG. 13 and, in case of the comparative mode of operation of the system 20, an additional indication of whether the endoscope is failed or passed is illustrated in a right column P/F.

Figure 6:
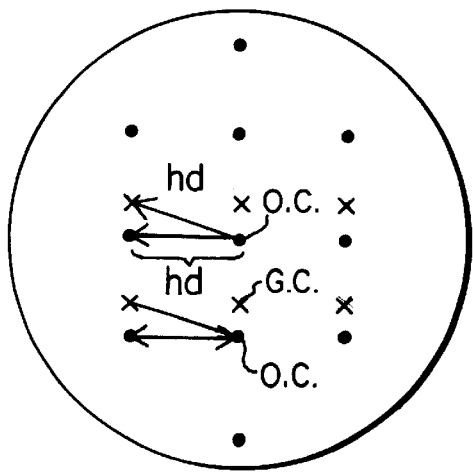
FIG. 6 is a graphical representation illustrating measurement of a geometrical distortion test.

As shown in FIG. 6, the geometrical distortion is measured by imaging the grid 62 and recording the position of each visible pinhole. In ideal endoscope, an optical center OC of the image coincides with its geometrical center GC. By determining the location of the pinholes and by calculating where those locations would be if there were no distortion, the latter can be calculated.

Particularly, by assuming that the optical center OC of the image is undistorted, an "undistorted" location for each of the imaged pinholes can be compared with the actual position, and the percentage distortion at each object point is measured:

$$\% D = (h_d/h_u - 1) \times 100\%$$

where % D is the percentage distortion of the point, $h_d$ is the distorted distance from the optical center of the image to the pinhole, and $h_u$ is the distance from the optical center to the pinhole if there were no distortion.

Figure 6A:
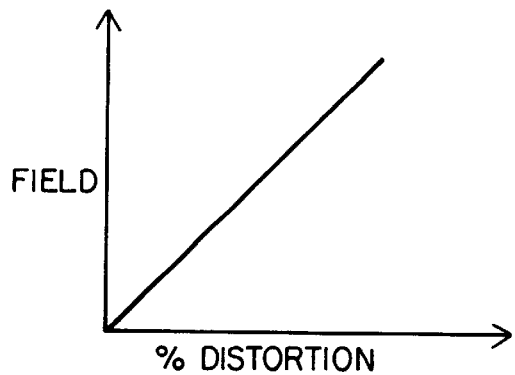
FIG. 6A is graph illustrating the geometrical distortion.

Next the percentage distortion is graphed as a function of normalized image height and a standard polynomial curve fit. As shown in FIG. 6A, the visible field is a polynomial function of the percentage of distortion. From this distortion at any desired height h, which is the normalized object height corresponding to a visible field of image view, can be determined. As shown in FIG. 13, the distortion of the endoscope as tested can be compared with a nominal value of the standard endoscope. The 1.0 field is an optical term defined by an edge of the field of view, whereas the other measurement is given for a smaller region, which is, in this case, 0.7.

Figure 7:
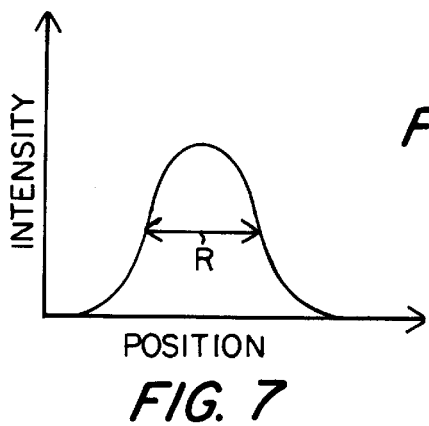
FIG. 7 is a graphical representation a spread point function of an imaged pinhole.

The image quality test at a single distance for the entire field of view is performed by imaging the grid 62 illuminated by the lamp 68 and using a method of the point spread function (PSF). By measuring the point spread function the image quality at each point is measured. Basically, this test indicates how sharp the image of each illuminated pinhole is. Every imaged point is spread out to a certain various degree because the endoscope does not make a perfect image, as shown in FIG. 7. The less blurry a region R is the better sharpness of this particular point is. Conversely, the wider the region R is the worse the image is. Assuming that each pinhole is infinitely small, then by measuring how big the pinhole is, it is possible to evaluate how this particular pinhole spreads out. Clearly, based on a PSF it is possible to calculate a modulation transfer function (MTF) for each of these points. However this is a lot of data to be processed.

In accordance with the invention, the system is capable of evaluating a spot size or region R for each pinhole by calculating relative brightness within this region. Thus, simply assuming that everything brighter than a certain empirical threshold value is a part of a spot, the size of this spot is evaluated and color coded and shown on the screen. Thus, blue indicates the best performance, then turquoise, orange, yellow, green and red indicate poor performance and black indicates no imaging points were found—meaning the performance is very bad.

Specifically, turning to the top row of photographs TP in FIG. 13, it is possible to evaluate the overall image quality and the image quality in the center of the image of the tested endoscope by comparing it with the standard endoscope. Also, it is possible to evaluate the percentage of the image that is "red", and finally, to evaluate the percentage of the image that is black. Based on this evaluation, the performance of the tested endoscope can be reliably measured.

Both the single pinhole target and the grid can perform the depth of field test. To utilize the grid, all but a single pinhole located directly in line with the theoretical optical axis of the endoscope are turned off. This is the only test when the carousel is displaceable relative to the distal end of the endoscope 50 at predefined object distances to measure the size of the image spot. Larger spots indicate poorer performance. The depth of field is defined as the object distance at which the spot size is less than a predetermined value. The depth of field is interpolated from the spot sizes measured. If the range of object distances measured does not bound the depth of field, words like "greater than", "less then", or "none" will appear in the Depth of Field Display 69 shown in FIG. 13. The actual spots from the scope being tested are displayed along with simulated spots from a standard scope if a comparative mode of operation is selected. As is seen in FIG. 13, the simulated spots are actually circles with the same area as the original spots. They give no indication of the shape of the original spots. In addition, the spots are color coded and, as is previously indicated, blue indicates the best performance, whereas red illustrates the poorest one.

The available object distances are limited because if the object distance chosen is too far from the best focus distance or if the scope transmission is too dim, then the system 20 will not be able to detect the pinhole resulting in erroneous measurements. As shown in FIG. 13, the numbers across the bottom of a screen are the object distances at which the images directly above them were obtained.

The same result in measuring the field view can be achieved by utilizing the single pinhole target 66 illuminated by a fiberoptic cable 72 which is plugged in a light source 74, as diagrammatically shown in FIG. 3.

Figure 8:
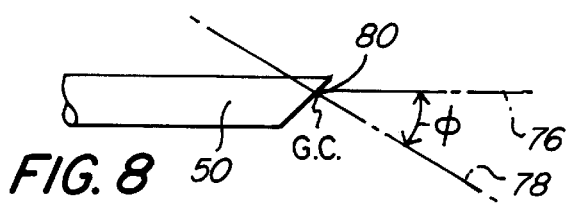
FIG. 8 is a graphical representation of an angle of view of an endoscope.

Both the grid 62 and the single pinhole target 66 can also be utilized to perform the angle of view test. To utilize the grid 62 all of the pinholes have to be turned off except for the one which is located in the center of the grid. An angle of view of an endoscope, as shown in FIG. 8, is defined as the angle formed by two rays which share a common endpoint at the center of the entrance pupil 80 of the endoscope 50. A first ray 76 extends in the z-direction, and the second ray 78 extends in the precise direction of the geometrical center (GC) of the endoscope field of view. It should be noted, therefore, that the angle of view measurement does not precisely define the direction of view.

Figure 9:
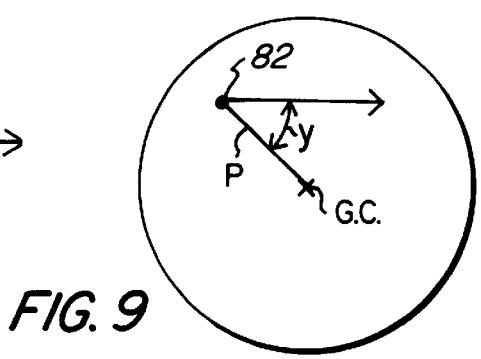
FIG. 9 is a graphical representation illustrating a measurement of the angle of view.

Referring to FIG. 9, if the endoscope was perfect, an image of the single pinhole 82 should be in the geometrical center of the image. However, it is hardly ever the case primarily because of manufacturing defects. As seen in FIG. 9, the pinhole image 82 is spaced from the geometrical image center GC at distance p and forms an angle y with the z direction which are converted from image distances to real world distances using conversion factors calculated during the field of view and distortion measurements. Using straightforward trigonometry the angle of view φ can be easily calculated.

Figure 10:
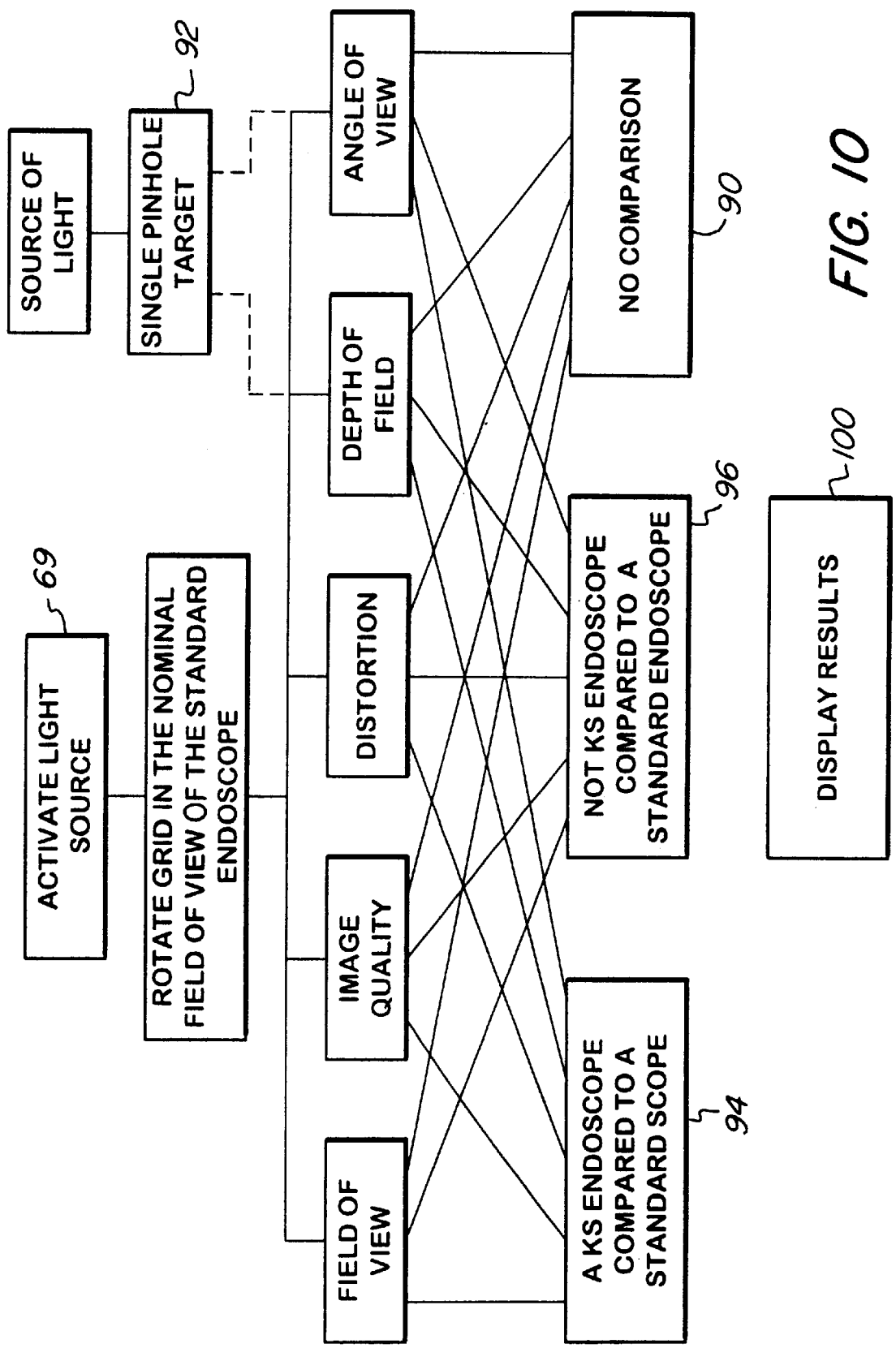
FIG. 10 is a flow chart illustrating the procedural steps for performing an image quality, field of view, distortion, and a depth of field tests of an endoscope to be tested by an apparatus of FIG. 1.

FIG. 10 summarizes the above described five tests that can be performed using the grid target 62. Thus, the lamp 69 positioned on the carousel in an alignment position with the grid target illuminates it from behind. The carousel then rotates into the nominal field of view of a standard endoscope to selectively perform any combination of the five tests, the results of which are displayed on the screen of the monitor. It should be remembered that the depth of field and angle of view tests can be performed by either the single pinhole target at 92 or the grid target. As mentioned above if the single pinhole target is utilized, then the fiber optic cable 74 connects this single pinhole target with the source of light 74 located at a distance from the carousel.

As has been mentioned before, the system 20 is able to test a Karl Storz endoscope by comparing it to a standard one of the same type which is stored in the database by selecting this mode of operation. In this case all the measured values are compared with a set of standards parameters at 94.

It is also possible to compare an endoscope other than Karl Storz to or a scope that is not in the data base and then compare it to a standard Karl Storz endoscope which is believed to be analogous to the tested one upon selecting this mode at 96. Finally, it is possible to test a scope without comparison to any other scope by simply introducing values according to the user's experience and knowledge 90. Regardless of the mode selected by the user, the results will be displayed at 100.

Figure 11:
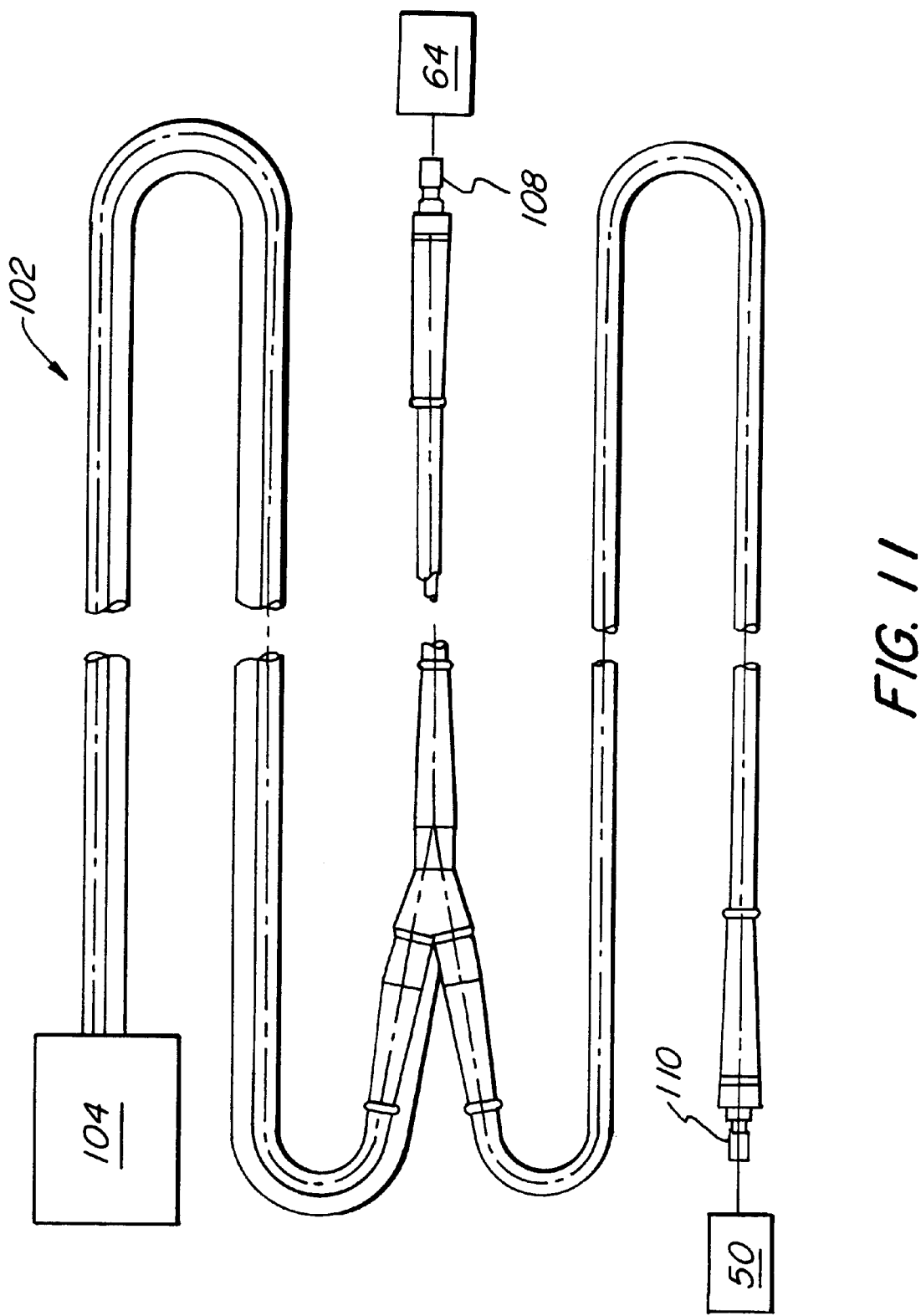
FIG. 11 is a schematic view of a bifurcated cable in accordance with an apparatus shown in FIG. 1.

According to another aspect of the invention, a bifurcated light guide 102, shown in FIG. 11 is used to measure a percentage light transmission through illumination fibers.

Specifically, the bifurcated light guide is fixed to a light source 104 (FIGS. 3 and 11) in such a way that the relative illumination through each output of bifurcated ends 108 and 110 cannot vary. The first bifurcated end 108 is plugged in a post 112 juxtaposed with the carousel 30 (FIG. 3), whereas the second bifurcated end 110 is connected to the endoscope 50, as diagrammatically shown in FIG. 11. Upon turning the light source on and selecting this test, the carousel 30 is rotated to displace the detector 64 in a position where it is aligned with the first end 108 and where it reads an output of the first end. The carousel is then turned to bring the detector 64 into the nominal field of the standard scope wherein the detector reads the output of the endoscope. The percentage light transmission through the illumination fibers can then be calculated:

$$\% T = y\, O_s/O_b$$

where $O_s$ is the output of the endoscope, $O_b$ is the output of the first bifurcated end 108, and y is the ratio of light out of the bifurcated light guide end 108 to the light out of the end that attaches to the scope.

According to still another aspect of the invention, the system 20 is capable of performing a relative light transmission test through an imaging system including a system of lenses by using the white target 60. The white target has approximately the same dimensions as the grid target and is made of opal glass having a piece of diffuse material, such as paper. Similarly to the grid target, the white target is slidably supported by a respective frame 114 (FIG. 3) and is aligned with and illuminated by a respective light source 116 (FIG. 3) mounted on the carousel 30.

Figure 12:
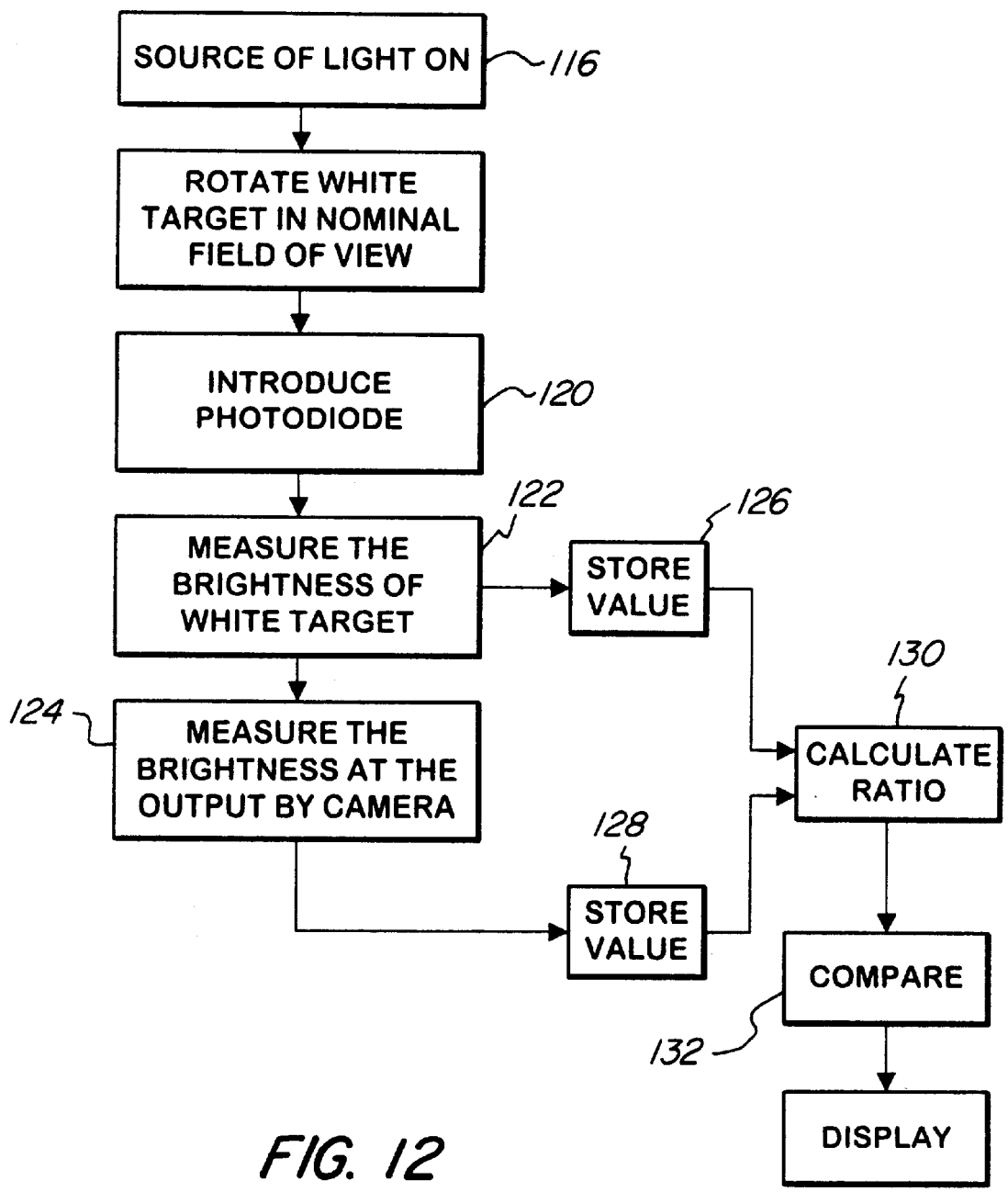
FIG. 12 is a flow chart illustrating the procedural steps for relative imaging system transmission test by an apparatus of FIG. 1.

FIG. 12, illustrates a flow chart for relative imaging system transmission showing, in general terms, how much light transmitted through the endoscope is lost. The test is performed by first attaching one of the ends of the bifurcated light cable to a socket formed on a distal end of the endoscope and turning the light on at 116. The brightness of the light source is measured by a photo detector, preferably a silicone photodiode, rotatable toward the other unattached end of the light cable introduced between the distal end of the scope and the carousel at 118. Then, after the photodiode is rotated to nominal field of view o the tested scope at 120, it measure output of the endoscope at 122. Both measurements are stored at 124, and a ratio is determined by the CPU upon dividing the measured output of the scope by the output of the unattached light guide at 126. This result is further multiplied by a known calibration factor at 130 with the final result displayed at 132 in the table of FIG. 13.

The white target can also be used in testing an illumination profile test that shows the relative intensity of the illumination of the white target 60 across the field of view of the endoscope 50. Basically, the illumination profile is a fall off of light from the center to the edge of the field of view of the endoscope. To perform this test the white target is illuminated by the fibers of the endoscope itself by connecting it to the bifurcated end 110 of the light guide, which is connected to the source of light 104.

In practical terms, it is always desirable that the edges of the field of view of an endoscope used by a surgeon are illuminated and if this is not the case, then this endoscope should not be used in a surgical procedure. The bottom representations BP of photographs of FIG. 13 display pictures showing the relative illumination, as seen at the camera 58, across the field of view of the tested and standard endoscopes. An array of concentric circles 134, which are white at the original photographs, are equidistantly spaced apart contour lines of image brightness. A circle 136 indicates the center of the illumination distribution. A square 138 is indicative of the dimmest location on the "edge" of the image, while a square 140 is the brightest location on the "edge" of the image. A first pair of cross lines 142 goes through the center of the image, while another pair of cross lines 144 is centered at the center of the image. If the illumination system of the endoscope including fibers have been damaged or, more likely, poorly designed, the photograph could have a big bright spot in the middle of the image whereas the edges would be dark. By comparing the photographs of the tested and standard endoscopes, as seen in FIG. 13, a user may conclude that the illumination system of the tested scope is acceptable.

Still another test, which the system 20 can perform, is an image analysis when the camera 58 is focused to infinity, as shown on a left picture (LP) of the middle row of FIG. 13. This indicator displays a picture representing the image quality across the field of the endoscope when the camera and endoscope coupler are set to image a distant object. On a screen this is image is color coded with blue regions representing areas of highest quality, red representing areas of lowest quality and black representing areas where no image data has been found. This analysis can be compared with a picture representing the image quality of a standard scope when the camera is focused to image a distant object. Similarly to the above described color codes, this picture has blue and red regions indicating poor high quality and poor quality areas, respectively.

This invention is not to be limited by the embodiment shown in the drawings and described in the description, which is given by way of example and not of limitation, but only in accordance with the scope of the appended claims.

What is claimed is:

1. An apparatus for evaluating performance of a test endoscope, comprising
    a source generating a beam of light entering a distal end of the test endoscope;
    a grid consisting of a plurality of pinholes intercepting the beam of light at a predetermined distance from the distal end for evaluating field of view, image quality, distortion and depth of field of the test endoscope.

2. The apparatus defined in claim 1 wherein the pinholes of the grid are uniformly spaced from one another at a predetermined distance, each having a predetermined uniform diameter.

3. The apparatus defined in claim 1 wherein the grid further performs an angle of view test wherein a one pinhole of the plurality of pinholes is illuminated.

4. The apparatus defined in claim 1, further comprising database storing a set of parameters of the tests conducted on a standard endoscope and a central processing unit which includes a comparator comparing the results of field of view, image quality, distortion, depth of field and the angle of view tests of the test and standard endoscopes.

5. The apparatus defined in claim 1 wherein the source and the grid are mounted on a rotatable carousel and are aligned with one another, the carousel supporting a second source of light aligned with a diffuse but translucent white target, a single pinhole target and a photo sensor for performing a percentage light transmission test through the test endoscope.

6. The apparatus defined in claim 1 wherein the grid is displaced to a nominal field of view of the standard endoscope at the predetermined distance from the distal end of the test endoscope and is illuminated to have a number of pinholes displayed on a monitor of the central processing unit, wherein a field of view of the tested endoscope being calculated as $2\tan(s/d\sqrt{N}/\pi)$, where d is the predetermined distance between a distal end of the tested endoscope and the grid, s is the uniform spacing between the pinholes and N is the number of pinholes.

7. The apparatus defined in claim 1 wherein the grid is displaced to a nominal field of view of the standard endoscope to perform the geometrical distortion test at each pinhole of the grid seen on the monitor by determining a location of each pinhole of the tested endoscope and by comparing it with a location of the respective pinhole of an ideal, undistorted grid.

8. The apparatus defined in claim 1 wherein the grid is illuminated to have the image quality of the pinholes of the entire field of view seen on the monitor, the image quality being measured by calculating a point spread function or MTF for each of the pinholes and by comparing it with a point spread function or MTF of the respective pinhole of the standard endoscope.

9. The apparatus defined in claim 6 wherein the monitor displays a table of results including a numerical value of the distortion test, the angle of view test and of the field of view test, the table further having a "pass/fail" column indicating a pass/fail result in response to a respective signal generated by the comparator of the central processing unit upon comparing the results of the respective test of the test and standard endoscope.

10. The apparatus defined in claim 8 wherein the monitor further displays a multi-colored visual image upon taking the image quality test, the image having regions colored in blue indicating the best performance, regions colored in turquoise, green, yellow, orange and red indicating a poor performance of the tested endoscope and regions colored in black indicating the worse performance.

11. The apparatus defined in claim 10 wherein a percentage of red and black regions is calculated by the central processing unit generating a signal indicating a "pass/fail" result upon comparing this percentage with the one of the standard endoscope.

12. The apparatus defined in claim 1 wherein the depth of field is measured by displacing the grid at a plurality of predetermined distances with respect to the distant end of the tested endoscope to have an actual spot size of the pinholes displayed at each of the predetermined distances and compared with a predetermined value.

13. The apparatus defined in claim 12 wherein the actual size of the pinholes of the tested endoscope at each of the predetermined distances is compared with a simulated spot from the standard endoscope displayed on the monitor.

14. The apparatus defined in claim 12 wherein each spot is color coded with blue identifying an acceptable depth of field and red identifying an unacceptable depth of field.

15. The apparatus defined in claim 5 wherein the white target is a plate made of opal glass having a piece of diffuse white paper.

16. The apparatus defined in claim 15 wherein the white target is illuminated by a second source of light upon being displaced to the nominal angle of view of the standard endoscope to perform a relative brightness test of the test endoscope calculated by the central processing unit as a ratio of the brightness at the proximal end of the endoscope to the brightness at the distal end thereof.

17. The apparatus defined in claim 16 further comprising a camera attached to a proximal end of the endoscope and a silicone photodiode juxtaposed with the distal end of the test endoscope for measuring the brightness of the image of the white target, the camera measuring the brightness at the proximal end of the endoscope.

18. The apparatus defined in claim 17 wherein the ratio of the brightness at the proximal end to the brightness at the distal end is compared to a ratio of the standard endoscope by the comparator with numerical values appearing on the monitor in response to a signal generating by the comparator upon comparison.

19. The apparatus defined in claim 15 wherein the white target is displaced to the nominal angle of view of the standard endoscope to perform an illumination profile test indicating relative intensity of the illumination of the white target across the field of view of the test endoscope.

20. The apparatus defied in claim 19 wherein the white target is illuminated by a source of light spaced from the carousel and connected to the endoscope by a bifurcated fiber optic cable which is designed to have a uniform light intensity output at first and second bifurcated ends thereof.

21. The apparatus defined in claim 6 wherein the photo sensor is displaced in a first angular position, wherein it is aligned with the first bifurcated end of the fiber optic cable to generate a first signal in response to reading an output thereof, the photo sensor being displaced to the nominal angle of view of the standard endoscope in a second position spaced angularly from the first position to generate a second signal in response to reading an output of the test endoscope connected to the second bifurcated end of the fiber optic cable.

22. The apparatus defined in claim 21 wherein a ratio of the second signal to the first signal calculated by the central processing unit indicates the percentage light transmission through the endoscope.

23. An apparatus for evaluating performance of a test endoscope, comprising
  a source generating a beam of light transmitted through the endoscope;
  a fiber optic light guide attached by one of opposite ends thereof to the source and having the other end bifurcated, so as one of the bifurcated ends is attached to the endoscope;
  a photo sensor rotatable between a first position, wherein it is aligned with another of the bifurcated ends for generating a first signal corresponding to an illumination output, and a second position, wherein the photo sensor is aligned with the endoscope at a predetermined distance therefrom for generating a second signal corresponding to an illumination output of the endoscope; and
  a controller for generating a third signal in response to the first and second signals corresponding to a percentage light transmission through the endoscope.

24. The apparatus defined in claim 23 wherein the one and other bifurcated ends of the fiber optic light guide have a uniform output.

25. The apparatus defined in claim 23 further comprising a grid consisting of a plurality of pinholes intercepting a beam of light generated by a second source of light at a predetermined distance from the distal end for evaluating a field of view, an image quality, distortion, depth of field and an angle of view of the test endoscope.

26. The apparatus defined in claim 25 wherein the pinholes of the grid are uniformly spaced from one another at a predetermined distance, each of the pinholes having a predetermined uniform diameter.

* * * * *